United States Patent

Björck

[11] Patent Number: 5,489,464
[45] Date of Patent: Feb. 6, 1996

[54] PACKAGING MATERIAL AND A METHOD FOR ITS MANUFACTURE

[75] Inventor: Bengt Björck, Bjärred, Sweden

[73] Assignee: Tetra Laval Holdings & Finance S.A., Pully, Switzerland

[21] Appl. No.: 229,345

[22] Filed: Apr. 18, 1994

[30] Foreign Application Priority Data

Apr. 19, 1993 [SE] Sweden ............................. 9301272

[51] Int. Cl.⁶ ..................... B32B 1/00; B65D 81/02; A63B 39/00
[52] U.S. Cl. ..................... 428/178; 428/167; 428/172; 428/188; 383/3; 264/512; 264/545; 156/145; 156/156; 156/268; 156/290; 206/522; 206/585; 206/593
[58] Field of Search ..................... 428/178, 188, 428/72, 167, 35.2, 35.7, 152, 172, 179, 192, 195, 198; 156/268, 290; 264/510, 512, 545, 551; 383/3; 206/522, 525, 585, 593

[56] References Cited

U.S. PATENT DOCUMENTS

| | | | |
|---|---|---|---|
| 3,868,056 | 2/1975 | Keren | 229/55 |
| 4,155,453 | 5/1979 | Ono | 206/522 |
| 4,164,970 | 8/1979 | Jordan | 150/3 |
| 4,465,188 | 8/1984 | Soroka et al. | 206/522 |
| 4,503,558 | 3/1985 | Lief et al. | 383/3 |
| 4,573,202 | 2/1986 | Lee | 383/3 |
| 4,714,506 | 12/1987 | Yamashiro et al. | 156/80 |
| 4,801,213 | 1/1989 | Frey et al. | 383/3 |
| 4,826,329 | 5/1989 | Bellini | 383/3 |
| 4,847,126 | 7/1989 | Yamashiro et al. | 428/35.2 |
| 5,128,182 | 7/1992 | Bunker et al. | 428/178 |
| 5,143,775 | 9/1992 | Olsson et al. | 428/178 |
| 5,178,281 | 1/1993 | Enzu | 206/522 |
| 5,180,060 | 1/1993 | Forti et al. | 206/522 |

FOREIGN PATENT DOCUMENTS

| | | |
|---|---|---|
| 167249 | 9/1993 | Denmark . |
| 0098347 | 1/1984 | European Pat. Off. . |
| 0172142 | 2/1986 | European Pat. Off. . |
| 0512187 | 11/1992 | European Pat. Off. . |
| 2164152 | 9/1972 | Germany . |
| WO89/06557 | 7/1989 | WIPO . |

Primary Examiner—Donald J. Loney
Attorney, Agent, or Firm—Burns, Doane, Swecker & Mathis

[57] ABSTRACT

Packaging material for self-supporting packaging container walls includes two material layers that are fixed at a given spacing from one another. The two material layers define an interjacent chamber which is filled with gas under pressure. The material is produced by the material layers being sealed to one another over a portion of their surface such that a chamber is formed which is filled with, for example, air under pressure.

26 Claims, 3 Drawing Sheets

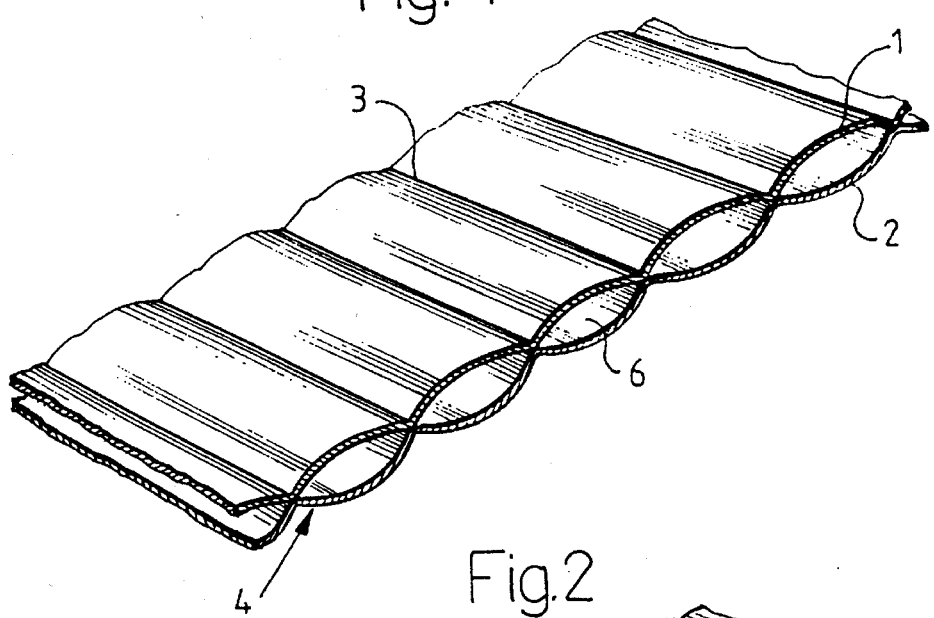
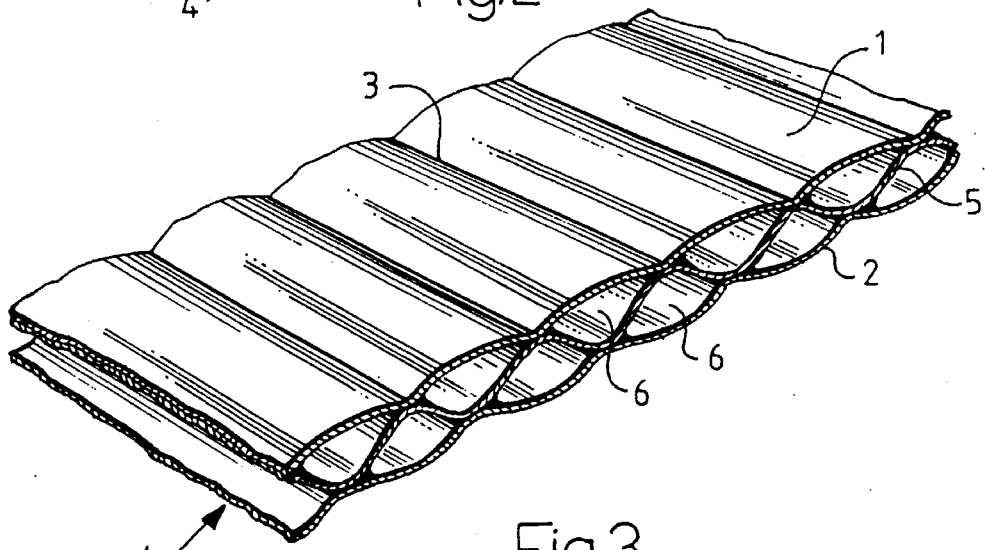
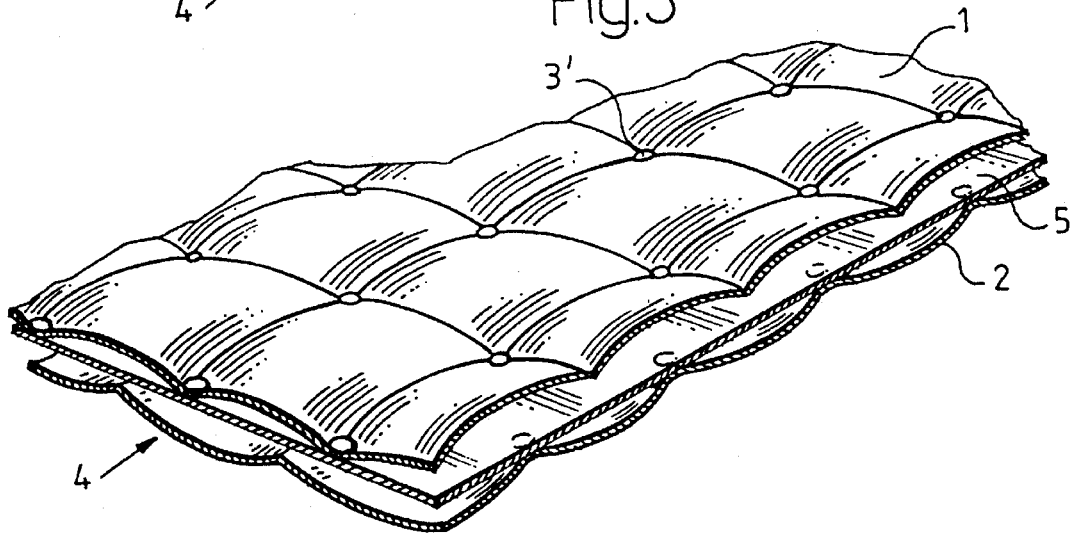

PACKAGING MATERIAL AND A METHOD FOR ITS MANUFACTURE

FIELD OF THE INVENTION

The present invention relates to a packaging material and more particularly to a packaging material for a self-supporting packaging container wall comprising mutually interconnected, flexible material layers. The invention also relates to a method of producing a packaging material and use of the packaging material.

BACKGROUND OF THE INVENTION

Consumer packages for, for example, liquid or pumpable foods are often manufactured from web or sheet-shaped material. The material can be a plastic film or a packaging laminate which includes layers of different materials. At least one surface layer of the packaging material often consists of thermoplastic which, on the one hand, ensures the liquid-tightness of the material and, on the other hand, makes it possible to heat-seal the material to itself to form a liquid-tight bond. A packaging material can normally be given satisfactory tightness against both gas and liquid penetration with the aid of thin (5 micrometers) layers of different plastic types, for example so-called barrier plastics, such as ethyl vinyl alcohol (EVAL) or aluminium foil. The sealing properties of the packaging laminate are ensured by the laminate displaying, at least at those parts which are to be sealed to one another, layers of thermoplastic material, for example polyethylene. Essentially two methods can be employed in order to ensure that the material possesses self-supporting properties, i.e. sufficient rigidity to be usable in the manufacture of configurationally stable, eg. parallelepipedic, packaging containers. First, the material can include a layer of inherently flexurally rigid material, for example board or metal, and secondly, the desired rigidity can be achieved if the layers of naturally flexible plastic material included in the material are placed at such a distance from one another by means of some spacer arrangement or device, that so-called bulkhead effect is achieved. This can be realised by connecting the material layers on either side of a relatively thick layer of, for instance, foamed plastic material or some other lightweight and inexpensive material which, together with the surface layers, forms a so-called sandwich construction.

In a sandwich construction including foamed plastic material which is clad on either side with a suitable, homogeneous plastic material such as polystyrene, the weight of the material included will, granted, be relatively light, but another problem occurs when handling the material—both before forming into packaging containers and afterwards—i.e. when the contents of the packaging container have been consumed and the used packaging material is to be recycled. That is, the sandwich construction is of relatively great thickness and is difficult to compress to compact dimensions since the entrapped air cells prevent this from happening.

In addition to known parallelepipedic packages with self-supporting packaging container walls manufactured from a packaging laminate which includes layers of paper, plastic and possibly aluminium foil, there are bag or cushion-shaped packaging containers in existence, for example for dairy products. These packaging containers are manufactured from a thinner packaging material which normally only includes one or more mutually connected layers of flexible, heat-sealable plastic material. Compared with packaging containers featuring self-supporting packaging container walls, bag or cushion-shaped packaging containers suffer from the disadvantage that they are difficult to handle, not only in transport to and from retail outlets, but also in handling and emptying by the consumer.

Packaging containers of the above-mentioned parallelepipedic type which include self-supporting packaging container walls of a laminated paper and plastic material contain in themselves more packaging material than an optimally designed bag pack. This has been considered necessary in order to ensure a sufficient material rigidity to make possible forming of the packaging containers, as well as their handling in both the unopened and opened state. The packaging laminate has been composed to reach the best possible optimization in use of the material types included, for example the fibre material, to achieve the desired rigidity and the plastic material to achieve the desired liquid-tightness. A packaging laminate composed of a plurality of material types will, however, be difficult to recover and recycle, since the different material types must, on recycling, be separated from one another and handled separately, a process which defies ready reduction into practice. If, however, it is desired to manufacture a packaging laminate exclusively from homogeneous plastic material, a plastic thickness of unrealistic size will be necessary to achieve sufficient rigidity, and this in itself entails a comparatively high level of consumption of plastics. Since the liquid-tight properties of plastics are not changed appreciably with the thickness of the plastics, attempts have been made in the art to realize a packaging material which possesses the desired rigidity but which contains a lesser quantity of plastics, by designing the material in a "bulkhead" like manner, i.e. by placing two relatively thin plastic layers at such spacing from one another that their flexural rigidity will be great. In order to fix the plastic layers at a suitable distance from one another, a light and economical intermediate layer is required, and one such previously employed layer is foamed plastic material. A laminate of this type may be manufactured from a single type of plastic, which facilitates recovery and recycling of the material. In order to achieve the desired rigidity, the laminate must however be made relatively thick and this entails practical handling problems in connection with disposal of the emptied packaging containers. In addition, it is difficult to manufacture a material of this type which possesses sufficiently high resistance to buckling.

OBJECTS AND SUMMARY OF THE INVENTION

One object of the present invention is, thus, to devise a packaging material which possesses such bearing capacity or flexural rigidity that it is suitable for manufacture of self-supporting packaging material walls but which, nevertheless, utilizes a minimum quantity of plastic material.

A further object of the present invention is to devise a packaging material which possesses maximum rigidity and high rupture resistance but which, by folding and heat sealing, is capable of being formed into packaging containers.

Yet a further object of the present invention is to devise a packaging material which includes only one material type.

Still a further object of the present invention is to devise a packaging material which, compared with prior art materials, considerably reduces the volume of refuse and waste which must be managed and which also otherwise obviates the above-outlined drawbacks.

The above and other objects have been attained according to the present invention through the provision of a packaging material for a self-supporting packaging container wall comprising mutually interconnected, flexible material layers in which the material layers are interconnected with one another in a pattern distributed over the surface area of the material layers, an interjacent chamber defined by the material layers being filled with a gas under pressure.

A further object of the present invention is to devise a simple and rational method for producing a packaging material of the above-mentioned type.

Yet a further object of the present invention is to devise a method of manufacture which makes it possible to seal the layers included in the packaging material in a desired sealing pattern.

Still a further object of the present invention is to devise a method of filling the chambers thus created with gas.

The above and other objects have been attained according to the present invention in that a method of producing a packaging material for a self-supporting packaging container wall comprising mutually interconnected flexible material layers includes sealing the material layers, over a portion of their surface, to one another such that a chamber is created, the chamber being filled with gas under pressure.

Still a further object of the present invention is to realize a manner of using the above-mentioned packaging material.

The packaging material, the method of its manufacture and its manner of use make it possible to realize, in a simple and highly economical manner, a packaging container with a self-supporting wall which enjoys an optimum relationship between rigidity (or buckling resistance) and material weight and which may be manufactured from a single type of plastic.

BRIEF DESCRIPTION OF THE DRAWING FIGURES

Preferred embodiments of both the packaging material and the method according to the present invention will now be described in greater detail hereinbelow, with particular reference to the accompanying, schematic Drawings which show only those details essential to an understanding of the present invention. In the accompanying Drawings:

FIG. 1 is a perspective view of a portion of a packaging material according to the present invention;

FIG. 2 is a perspective view of a portion of a second embodiment of the packaging material according to the present invention;

FIG. 3 is a perspective view of a portion of a third embodiment of the packaging material according to the present invention;

DETAILED DESCRIPTION OF PREFERRED EMBODIMENTS

Figure 4:
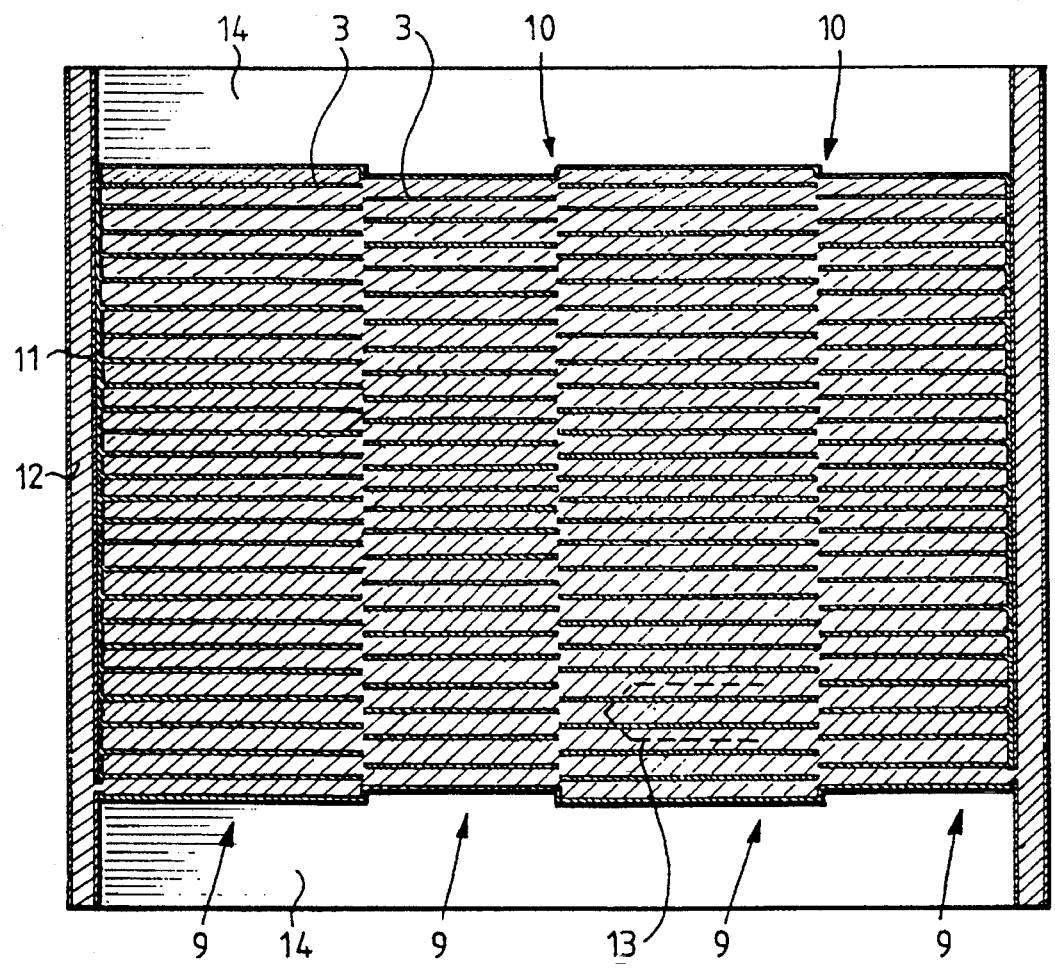
FIG. 4 shows a packaging material according to the present invention in the form of a blank for the manufacture of a parallelepipedic packaging container.

The present invention makes for a packaging laminate which is sufficiently rigid to afford the desired stability, but at the same time is flexible and foldable enough to make possible reforming into a finished packaging container. A reduction of the quantity of material employed will thereby further be achieved according to the present invention in that the outer layers of the laminate are held at the desired spaced apart relationship from one another with the aid of a gas or air which is entrapped in a chamber located between the outer layers. More precisely, the packaging material consists of a laminate which includes a first and a second flexible material layer 1, 2 which are disposed in spaced apart relationship from one another and which are mutually interconnected to one another in a pattern of sealings 3 distributed over the layers 1, 2. As a result, an elongate, for example serpentine chamber 4 being formed between the layers 1 and 2. The chamber 4 is filled in a suitable manner with gas or air under pressure and both of the material layers 1 and 2 will thereby automatically be kept at such a distance from one another as is permitted by the mutually sealed portions of the layers 1 and 2. A first embodiment of such a packaging material is shown in FIG. 1.

FIG. 2 shows a second embodiment of the packaging material according to the present invention, in which both of the outer material layers 1, 2 are interconnected with one another via an additional, central material layer 5 which forms a central layer between the two outer material layers 1, 2. The central material layer 5 is connected with each of the two outer material layers 1 and 2 by the intermediary of the linear sealings 3, while the chamber 4 (which is filled with gas under pressure) is located between the layers. The chamber 4 is defined by the two outer material layers which are either directly or indirectly connected with one another and which together define the extent of the chamber. In its turn, the chamber 4 is divided, by means of the linear sealings 3 and the central layer 5, into a pattern of mutually connected cells or subchambers 6. This will be described in greater detail hereinbelow.

FIG. 3 shows a third embodiment of the packaging material according to the present invention. This embodiment comprises, like the embodiment according to FIG. 2, three material layers, viz. the two outer material layers 1 and 2 and the material layer 5 sandwiched between them. The layers 1, 2 and 5 are mutually interconnected by means of spot seals 3', which connect the two outer layers 1 and 2 on either side of the central material layer 5 so that a chamber 4 is created therebetween. The chamber 4 is divided into two parts by the central layer 5, these parts being, however, in communication with one another via apertures (not shown) in the central layer 5. The spot seals 3' may, of course, be supplemented with linear seals which divide the chamber 4 into cells (not shown) of the desired configuration.

The three embodiments of the packaging material shown in FIGS. 1, 2 and 3 thus all include the two outer material layers 1, 2, each of which optionally consisting of one or more laminated or co-extruded part layers, depending upon the desired properties of the packaging material. If the material layer can consist of but a single type of plastics, this is clearly an advantage from the point of view of material recovery and recycling. One polymer which has proved to be suitable for packing most food types is polyethylene terephthalate (PET) which possesses a sufficiently high gas barrier property to ensure that the gas entrapped in the chamber is not diffused through the material walls. At the same time, PET boasts a high modulus of elasticity, i.e. it is not readily stretched, which it vital for ensuring the rigidity of the packaging material. By using modified PET, it will moreover become possible to heat-seal the material to itself in a satisfactory manner, which obviates the need for additives so as to make possible the internal sealing in the packaging material.

The total rigidity of the packaging material is determined, on the one hand, by the material properties included in the material layers, and, on the other hand, by the geometric configuration of the material. As has been mentioned previously, a need has been expressed in the art for a packaging material which can be employed for forming self-supporting packaging container walls, which places extreme demands on the rigidity of the material. By employing the so-called sandwich construction, that is by placing two material layers at a relatively large distance from one another, the desired rigidity will be achieved, on condition that both of the outer material layers 1, 2 possess a high modulus of elasticity, i.e. do not readily stretch when placed under stress. The geometric configuration of the material should be such that both of the outer material layers 1 and 2 are fixed at maximum distance from one another, this being effected by filling the chamber 4 with gas under pressure. When the packaging material is subjected to bending load, the excess pressure prevents the material layers exposed to pressure strains from folding together and buckling, which would injuriously affect the total rigidity of the packaging material.

On condition that the excess pressure can prevent the geometric configuration of the material from being changed, the rigidity of the material will exclusively be determined by the modulus of elasticity of the outer layers, combined with the distance between the two outer layers, i.e. the total thickness of the packaging material. In addition to previously mentioned requirements on the included material types in terms of gas barrier properties, fusibility, sealability etc., it is thus of major importance that the two outer layers be manufactured from a material which does not readily stretch when subjected to strain.

Given that the packaging material according to the present invention has two outer material layers 1, 2 which each include a plurality of part layers of different material types, the total properties of the packaging material can, of course, be optimized. Ideally, a central layer region of high modulus of elasticity is selected for each material layer, this being coated on either side with outer layers possessing optimum sealing properties. For example, films of oriented polymer normally possess a high modulus of elasticity, but are less well suited for heat-sealing. Examples of such films applicable in this context are polyester, polyamide or polypropylene. When such films are employed as a central film section in both of the outer material layers 1 and 2, layers of sealable or fusible thermoplastic, for example polyethylene are applied on either side of the oriented polymer film. Adhesive layers of the ionomeric type may possibly also be used, and it is naturally possible to combine additional layer sections with one another in order to build up the total material layer 1, 2. The overall gas barrier of the packaging material may moreover be further improved if the gas barrier layer of, for example, polyester is metallized in a per se known manner, is glass coated or otherwise given improved gas barrier properties. Of course, when material layers which are not mutually compatible for sealing together are employed, it is also possible to provide for the sealing with the aid of a conventional hot-melt.

Thanks to the structure of the packaging material according to the present invention, the desired rigidity will be obtained for making possible self-supporting packaging container walls as a result of the geometric construction in combination with the properties of the materials included, and as a result the material layers can be very thin. By way of example, it might be mentioned that an oriented polyester of a thickness of but 10 micrometers has proved to result in a packaging material of sufficient rigidity to form a parallelepipedic package of a volume of 1 liter. However, in practice use is made of a slightly thicker material of, for example, between 15 and 20 micrometers. The total weight of plastic material in a parallelepipedic package of a volume of 1 liter will, in such instance, be approx. 10 g, which may be compared with the total plastic weight in a bottle of a volume of 1 liter, which amounts to approx. 40 g.

The gas which is employed to fill the chamber 4 and sustain the chamber under a certain excess pressure is preferably air, but may also consist of some other suitable gas such as, for instance, nitrogen gas or carbon dioxide. As has been mentioned previously, the gas serves partly to keep both of the external material layers 1, 2 of the packaging material at a distance from one another, and partly to prevent the material layer (which on bending of the material, is exposed to compression stresses) from folding together so that the material collapses. This latter purpose is served only if the gas is at a certain excess pressure which should amount to at least approx. 0.5 bar. An increase of the gas pressure further reduces the risk of material collapse on bending, but does not in itself render the material more rigid. Depending upon the dimensions of the packaging material, the size of the finished package and the desired durability thereof, the gas may be at an excess pressure of as much as up to approx. 10 bar. In most cases however, an excess pressure of between 2 and 3 bar is probably satisfactory.

Figure 5:
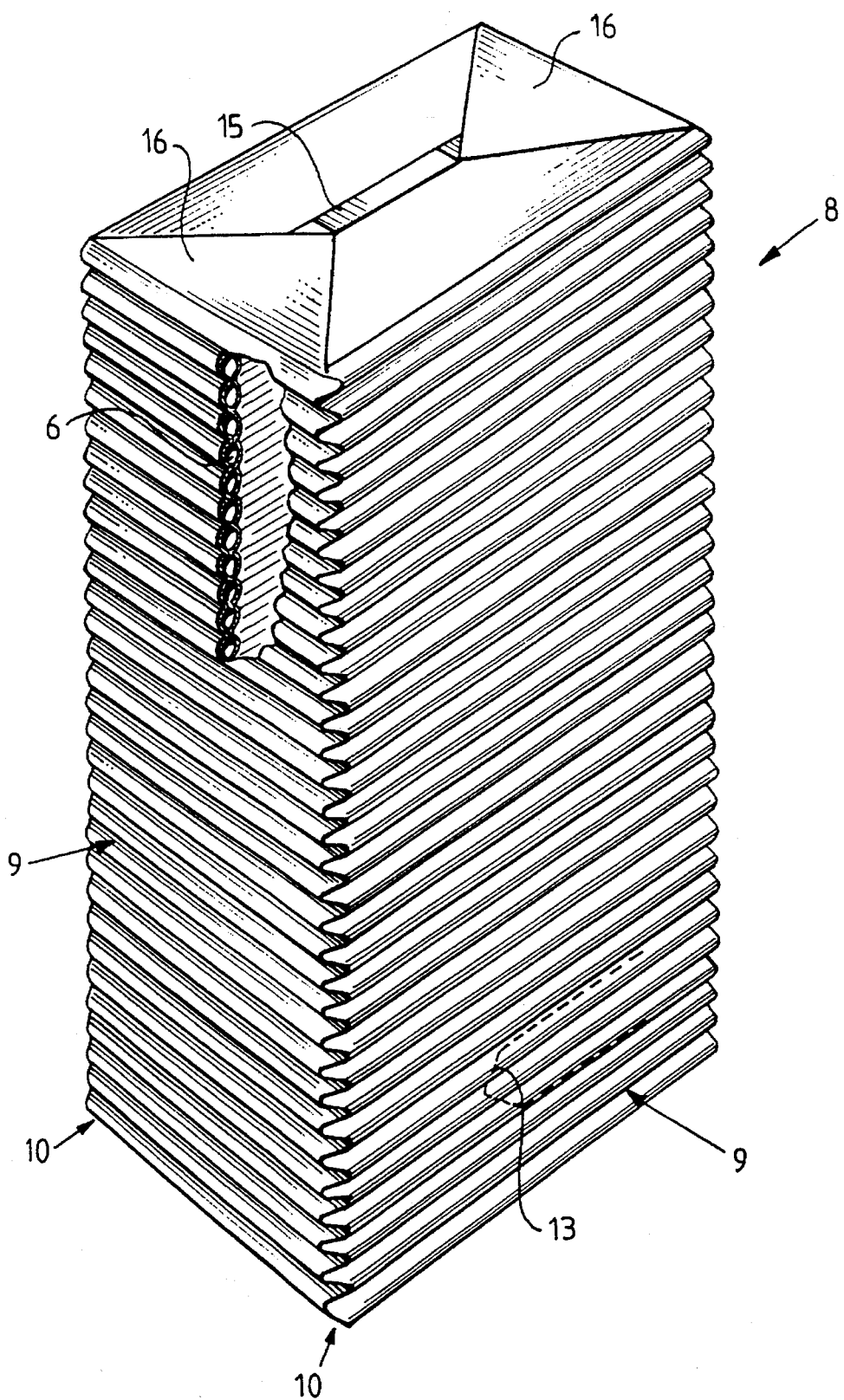
FIG. 5 shows, in partly broken-away perspective, a parallelepipedic packaging container formed from the blank according to FIG. 4.

The chamber 4 located between the two outer material layers 1, 2 is, as has been mentioned previously, divided by means of a suitable pattern of, for instance, linear sealings 3, into a large number of subchambers or cells 6 in the form of oblong channels which are mutually interconnected. Without departing from spirit and scope of the inventive concept as herein disclosed, the cells may be of any optional configuration, but if a regular, for example parallelepipedic packaging container is to be formed from the packaging material, it is appropriate to form the cells by means of linear, mutually parallel sealings 3, which are located substantially equidistant from one another. There will hereby be created, when the packaging material is filled with gas under pressure, an external material surface which has a "corrugated" appearance, i.e. consists of a number of parallel "gas filled plastic cylinders". One or more of these may, naturally, be of other configuration if, for example, the intention is to create, in the surface of the packaging container, a relief pattern in the form of a trademark, text or the like. A regular pattern created by linear sealings 3 is shown in FIG. 4 which illustrates one possible embodiment of a packaging material blank for a parallelepipedic packaging container of the type illustrated in FIG. 5. It is apparent from FIG. 4 how a material portion 7 has, by means of mutually parallel linear sealings 3, been given a pattern of oblong cells 6. The finished packaging container 8 (FIG. 5) has four, self-supporting vertical wall panels 9 which are also visible in FIG. 4. Between the wall panels 9, the packaging container 8 has corners in the form of fold lines 10 which, as is apparent from FIG. 4, have been realized in that the linear sealings 3 defining the cells 6 have, at the different wall panels 9, been mutually offset a distance which corresponds to half of the width of one cell. The diameter of the gas filled "cylinders" formed by the cells is hereby reduced to half in the transition between one wall panel and an adjacent wall panel, which gives the material less resistance to bending along the fold lines 10. The material portion 7 may hereby readily be reformed into a packaging container of rectangular cross sectional configuration. In addition to the method for realizing weakened fold lines through the transition between mutually offset groups of cells 6, fold lines can be realized in other ways. Thus, the material will show a greater tendency to fold also in those material areas which are sealed together to one another, as is the case along the parallel edges of the material portions 7 where edge seals 11 define the area of the material provided with cells 6 from edge channels 12 which are utilised for filling the cells 6 with gas, as will be described in the following.

The chamber consisting of the cells 6 and edge channels 12 is capable of communicating with the ambient atmosphere via an evacuation arrangement 13 which may be in the form of a prepared material weakness which makes it possible to grasp and remove a portion of the one, external material layer 1, 2 of the packaging material. The evacuation arrangement 13 may also consist of a hole punched in the one material layer 1, 2 and a tear strip covering this hole in gas-tight fashion. When the packaging container has been emptied of its contents and is to be collected for recycling and reuse or disposal, the evacuation arrangement 13 is made operative for emptying the chamber of gas so that the packaging material collapses and may simply be compressed down to slight volume. The evacuation arrangement may, of course, be replaced by a printed indication on the packaging container that a container wall can be punctured using a knife, scissors or the like.

Both above and below the region divided up by the cells 6, the packaging material 7 displays two end portions 14 in which both of the external material layers 1, 2 of the packaging material are heat-sealed to one another throughout their entire surface. These end portions are utilised on reforming of the packaging material into a parallelepipedic packaging container according to FIG. 5 in order to form the upper and lower end walls of the packaging container, which is effected in a per se known manner in that the material is fused together in a transverse sealing fin 15 so that two opposing corner flaps 16 are formed which, after being pressed flat, are folded in and sealed against the end wall of the packaging container. This technique is well known in the art and is unlikely to need any detailed description in this context.

When a packaging material according to the present invention is manufactured, the two material layers 1, 2 are sealed to one another so that a chamber is formed, this being then filled with pressurized gas. The material layers 1 and 2 may, as has been mentioned above, each consist of different part layers which are laminated to one another or co-extruded in a per se known manner. If the surfaces of the material layers facing one another consist of thermoplastic material, the layers 1, 2 are ideally heat-sealed to one another over a part of their surface so that the desired sealing pattern is created. Both of the material layers can be heat-sealed to one another in that they are caused to pass between sealing jaws or rollers whose work surface displays heatable sealing lines of the desired configuration. An alternative possibility for providing the desired sealing pattern is to apply, between the mutually facing surfaces of the material layers 1, 2, an anti-sealant, eg. a heat resistant printing ink. This method is indicated in FIG. 4 where the hatched region of at least the one material layer is coated with anti-sealant. The uncoated surfaces of the material portion 7 can simply be heat-sealed to a conventional layer of thermoplastic by heating and simultaneous or subsequent compression throughout the entire surface, in which event only the uncoated portions of the material layer will be sealed to one another. When this has taken place, one or both of the edge channels of the material can be placed in communication with a gas source (eg. for air, nitrogen gas or carbon dioxide), for example an external pressure gas bottle, whereby the chamber and the cells 6 forming the chamber are inflated to the desired excess pressure. This may be put into effect in connection with the manufacture of the material or not until the reforming of the material into individual packaging containers.

One alternative possibility for realizing the desired gas pressure in the chamber of the packaging material may be to coat the surface of one material layer defining the chamber with a gas-generating coating, which is pressed onto the material in the desired pattern prior to sealing together of the material layers. If the gas-generating material moreover possesses anti-sealant properties, the employment of a printing ink to this end can, of course, be dispensed with. Mixtures of an anti-sealant and a gas-generating agent can also be employed. A suitable gas-generating agent is bicarbonate, which forms carbon dioxide on the supply of heat. This supply of heat may be be put into effect in connection with the heat sealing operation, or at a later stage.

Of course, materials which are not inherently heat-sealable can also be connected to one another with the aid of a suitable adhesive or bonding agent, for example so-called hot-melt, which is applied in the desired sealing pattern between the material layers.

If the finished packaging container is to display a prepared opening arrangement, this can be placed at the end wall of the packaging container where a hole can be provided in the packaging container wall without the gas flowing out of the chamber 4 of the packaging material. If the end walls of the packaging container are also to be provided with inflated cells 6, these can be designed in such a manner that an enclosed region is defined in which an opening arrangement of optional known type may be placed.

It will be apparent from the foregoing description how the concept according to the present invention, i.e. the manufacture and use of a packaging material which includes two outer material layers separated by a gas under pressure, can be employed for forming packaging materials and packaging material containers with as good as any desired configuration whatever. Thanks to the present invention, the packaging container walls will be self-supporting and the packaging container will possess maximum rigidity without rigidifying layers in the conventional sense being included in the packaging material. This will hereby minimize the consumption of plastic material, at the same time as use of non-plastic materials is avoided, so that recovery and recycling of the packaging material is greatly facilitated. Management of used packaging material will also become simpler because of the possibility of "collapsing" the material by letting out the gas.

While this invention has been illustrated and described in accordance with a preferred embodiment, it is recognized that variations and changes may be made by others, and equivalents employed, without departing from the invention as set forth in the claims.

What is claimed is:

1. A packaging material for a self-supporting packaging container wall comprising at least two flexible material layers each having a surface area, the two material layers being interconnected with one another in a pattern of sealings distributed over the surface area of the at least two material layers to define between the two material layers a plurality of connected cells, said cells being filled with gas under pressure and being arranged in adjacent groups, the adjacent groups of cells being offset with respect to one another to define fold lines between adjacent offset groups of cells.

2. The packaging material as claimed in claim 1, wherein the at least two material layers are fabricated of gas-tight heat-sealable material.

3. The packaging material as claimed in claim 2, including an additional material layer which is connected to each one of the at least two flexible material layers and which is disposed to maintain the at least two flexible material layers at a predetermined distance from one another.

4. The packaging material as claimed in claim 1, wherein said at least two layers and said additional layer are interconnected by linear sealings.

5. The packaging material as claimed in claim 1, wherein said at least two layers and said additional layer are punctiformly interconnected with one another.

6. The packaging material as claimed in claim 4, wherein the cells are channel-shaped.

7. The packaging material as claimed in claim 6, including means for connecting each cell with ambient atmosphere.

8. The packaging material as claimed in claim 1, including a plurality of fold lines for allowing regions of the packaging material to be folded to produce a packaging container having a plurality of walls.

9. The packaging material as claimed in claim 1, wherein the gas is at an excess pressure of 1 to 10 bar.

10. The packaging material as claimed in claim 1, wherein the gas is air.

11. The packaging material as claimed in claim 1, wherein the gas is nitrogen gas.

12. A method of producing a packaging material for a self-supporting packaging container wall comprising providing at least two flexible material layers each having a surface area, interconnecting the material layers to one another over at least a portion of their surface areas to form a plurality of adjacent groups of cells with adjacent groups of cells being offset with respect to one another so that fold lines are defined by transitions between adjacent offset groups of cells, and filling the cells with gas under pressure.

13. The method as claimed in claim 12, wherein mutually facing surfaces of the material layers are heat-sealed linearly to one another.

14. The method as claimed in claim 12, including applying an anti-sealant between the mutually facing surfaces of the material layers.

15. The method as claimed in claim 15, wherein the anti-sealant is printed in a desired pattern on one of the material layers.

16. The method as claimed in claim 15, wherein the anti-sealant applied between the facing surfaces of the material layers is a heat-resistant printing ink.

17. The method as claimed in claim 12, wherein the cells are in communication with an external pressure gas container.

18. The method as claimed in claim 15, including providing the cells, prior to sealing, with an internal gas source.

19. The method as claimed in claim 18 including activating the gas source during reforming of the material into packaging containers.

20. The method as claimed in claim 18, wherein the gas source is printed onto the material in the form of a coating of the desired pattern prior to sealing together of the layers.

21. A method of making a packaging container for holding consumable contents, comprising:

providing two flexible material layers which each have oppositely disposed surfaces;

interconnecting facing surfaces of the two material layers at a plurality of places to define a packing material laminate in which a plurality of cells are located between the two material layers, the cells being divided into adjacent groups with adjacent groups of cells being offset with respect to one another to define fold lines between adjacent offset groups of cells;

filling the cells with gas under pressure; and folding the packaging material laminate along the fold lines to produce a packaging container having a plurality of side walls that together define an interior for holding consumable contents.

22. The method according to claim 21, wherein said step of interconnecting the facing surfaces of the two natural layers includes interconnecting the facing surfaces of the two material layers along a plurality of sealing lines to produce said cells.

23. The method according to claim 22, wherein said folding step includes folding the packaging material laminates so that each side wall includes one of said groups of cells.

24. A packaging container comprising an end wall and a plurality of self-supporting upstanding side walls, adjacent side walls being connected to one another at corners, the side walls and end wall together defining an interior for holding consumable food, each of said side walls including a group of cells which are each filled with gas under pressure, the group of cells in each side wall being offset with respect to the groups of cells in adjacent side walls.

25. A packaging container according to claim 25, wherein each of the side walls is comprised of at least first and second flexible material layers interconnected to one another in a pattern of sealings to define said group of cells filled with gas under pressure, the cells in each group being positioned vertically above one another.

26. A packaging container according to claim 26, including an additional layer interposed between said first and second material layers.

* * * * *